Feb. 1, 1966  N. H. VACHA  3,233,146
LIGHTING SYSTEM ADAPTED FOR ENVIRONMENT
CONTROL IN PLANT GROWTH CHAMBERS
Filed March 9, 1964  4 Sheets-Sheet 1

INVENTOR.
NORMAN H. VACHA
BY Richard Mac Cutcheon
HIS
ATTORNEY

INVENTOR.
NORMAN H. VACHA
BY
Richard Mac Cutcheon
ATTORNEY

3,233,146
Patented Feb. 1, 1966

3,233,146
LIGHTING SYSTEM ADAPTED FOR ENVIRONMENT CONTROL IN PLANT GROWTH CHAMBERS
Norman H. Vacha, 14444 E. Carroll Blvd.,
University Heights 18, Ohio
Filed Mar. 9, 1964, Ser. No. 350,177
3 Claims. (Cl. 315—97)

This application is a continuation in part of my copending patent application Serial No. 128,417, filed Aug. 1, 1961, now abandoned.

The present invention relates to lighting systems and methods and has particular significance in connection with environmental control for chambers and plant growth rooms in which it is essential to have artificial illuminating devices give rated production so as to produce constant environmental conditions to permit a scientist or a researcher to measure and report accurate results.

The invention also has significance in connection with high intensity illumination for promoting plant and algae growth even where no measurements are made, for example in bomb shelters, in undersea vessels on long voyages, or at stations in the Arctic or Antarctic, or wherever it is essential to provide healthful diet supplements and/or boost morale by growing things with artificial light.

Ever since the advent of the fluorescent lamp, wires have been taken to the lamp fixtures in which are located the necessary ballasts, the cathode supply transformers, and starting equipment if any be needed. But, as the luminosity requirements go higher and higher, for example for artifically stimulating the growth of plants, which might even be located on a conveyor belt, it is found that ordinary commercial equipment is erratic, cumbersome and unreliable and requires an inordinate amount of maintenance even if artificial cooling is provided.

Further, in the past, for plant growth or other high energy applications total circuitry predominantly prewired has not been available, and even if it were the number of and the enormous size of the requisite conductors would militate against its commerical acceptance, particularly when fluorescent lamp ballasts are remotely located from the lighting units (luminaries) as a requirement to reduce heat load in the environment control area.

There have been other disadvantages in the past such as the unavailability of high level lighting adequate to provide a scientific background for controlled experiments, the tendency of lamp ballast impregnating compounds to leak out when the ballast is used for maximum lighting, and voltage drop resulting inferior lamp operation when ballasts are remoted from the lamps.

It is an object of the present invention to provide simple means for overcoming the above mentioned difficulties.

Another object is to provide prewired packages of high output lighting equipment while reducing the size of conductors required, eliminating the need for impregnating compound in connection with fluorescent lamp ballast, providing circuitry more readily adaptable to the dimming or flashing or over current operation of high output fluorescent lamps, and substantially reducing the weight and installation costs for high level lighting applications.

Other objects and advantages will become apparent and the invention may be better understood from consideration of the following description taken in connection with the accompaning drawings, in which.

Figure 1:
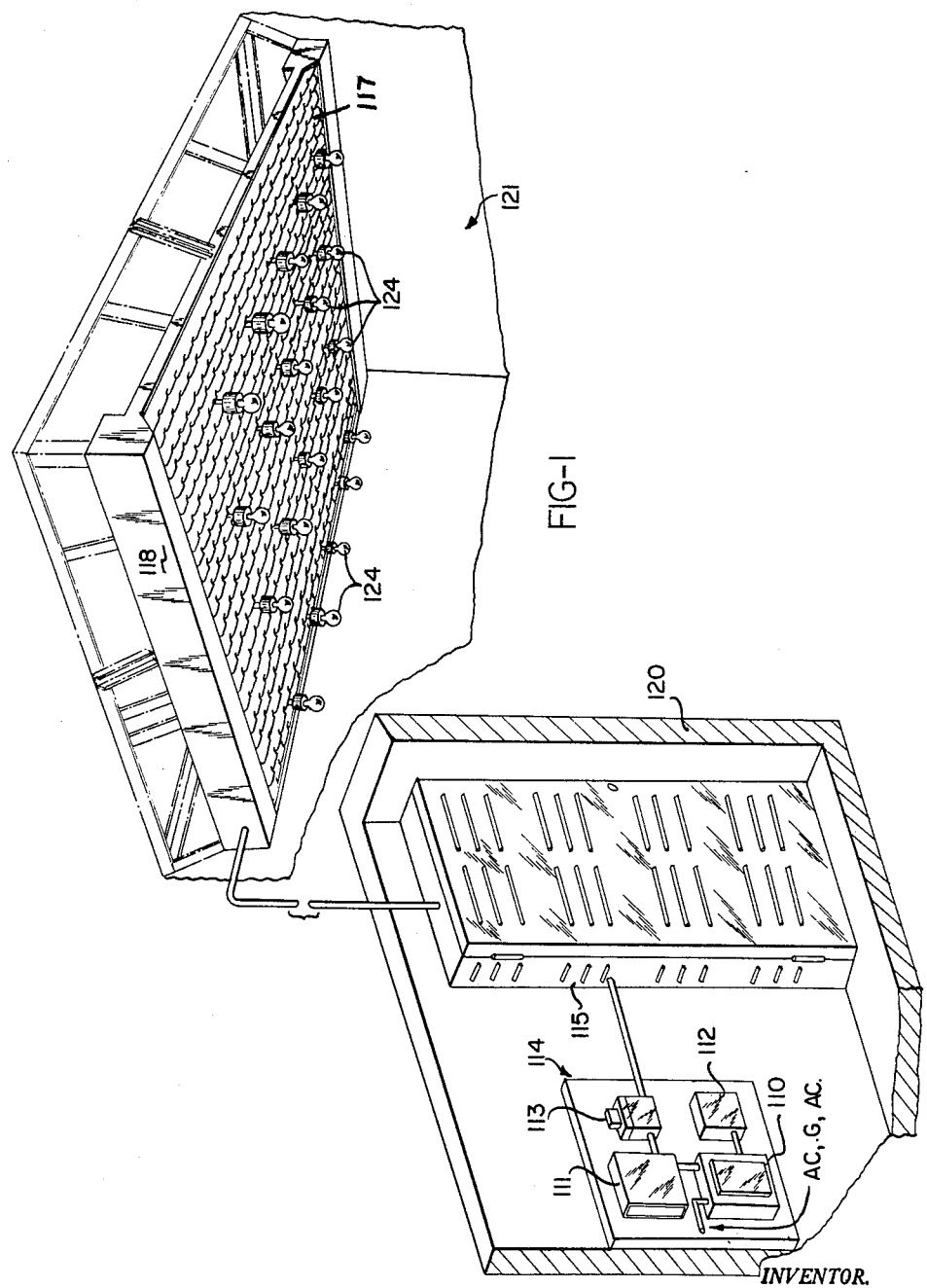
FIG. 1 is a diagrammatic view showing location of apparatus in accordance with the invention.

Referring to the drawings, I have shown a light system which may be engineered and maunfactured for any size room or chamber or area and for use with any power supply, although a 3-wire 120/240 volt source may be assumed.

Figure 2:
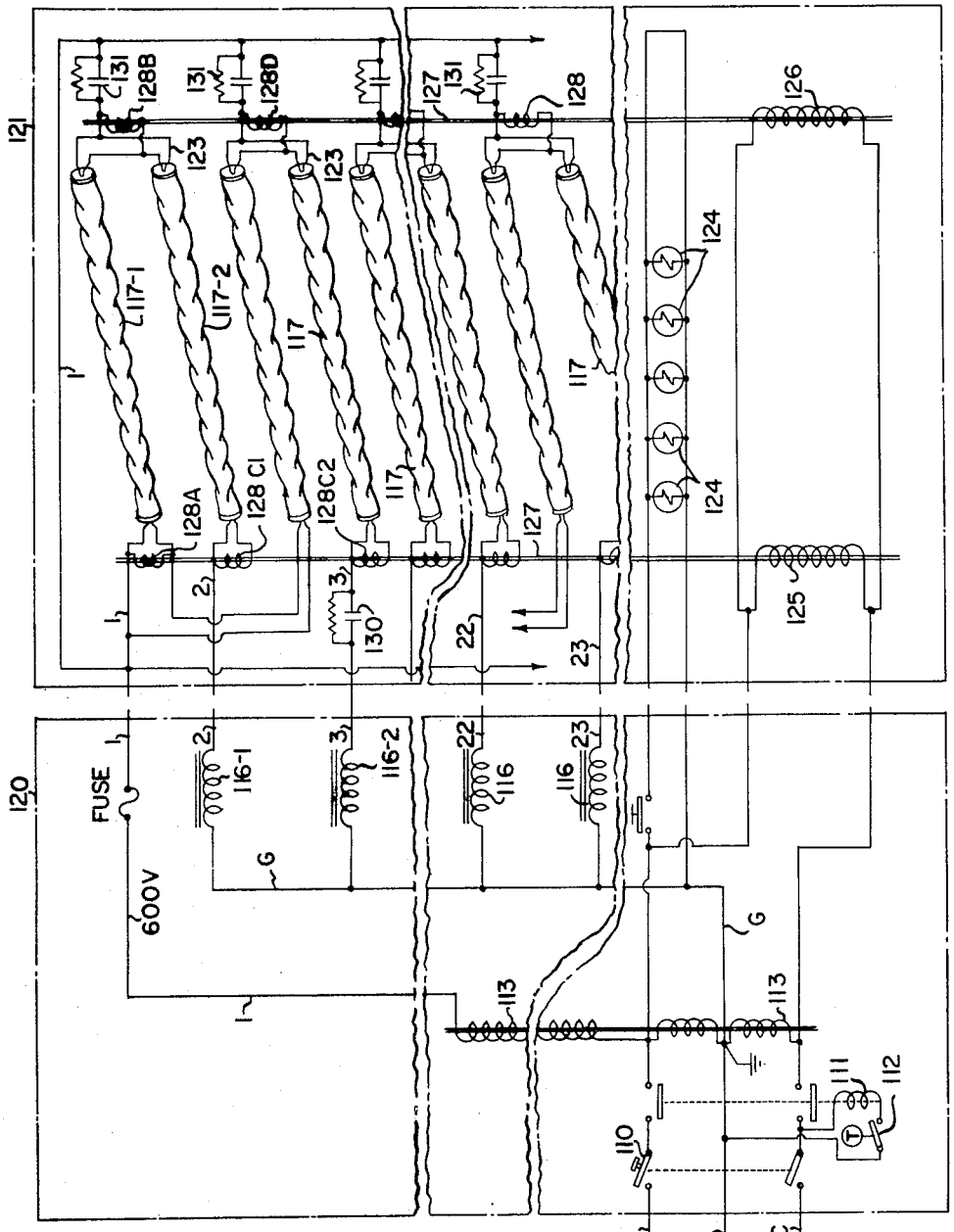
FIG. 2 is a simplified schematic wiring diagram of apparatus according to one aspect of the invention partly broken away to indicate omission of much apparatus more or less identical to that shown.

Electrical components necessary for operation are prewired and mounted in steel cabinets which may be shown in FIG. 1 include cabinets for a main switch 110, an A.C. contactor 111, a time switch 112, and a rector supply transformer 113, all mounted on an entrance panel 114, while a separate and ventilated cabinet 115 houses ballast reactors 116 (see FIG. 2). The reactors furnish the ballast for end-for-end supply for fluorescent units 117 mounted in lightweight aluminum frame modules 118, for example 24" wide and 96" long and interlocked with a common wireway which may readily be made to make the assembly of modular units appear as a single unit, for example of 8' x 8' size. Good results have been obtained using General Electric Co. "Power Groove" and T10 fluorescent lamps, although other high output (Westinghouse SHO or Sylvania VHO) lamps can be used instead.

In accordance with the present invention, I achieve many advantages, as herein specified in greater detail, by relocating many of the accessories for the lamps, putting the ballasts in a thermally remote space or room 120 and also operating them at higher than usual voltage so that their weight, which is lessened, and also their heat dissipation, which is also lessened, become immaterial to the environmental conditions in a thermally separate plant growth room 121, in which the lamps are located.

I have found that the lamp makers specify rated lumens which are available only when proper end-for-end arc maintaining (ballast) current, for example 1.5 amps. per lamp, is supplied whereas the ordinary ballast in commercial fixtures afford only about 1.39 amps. and probably cannot be greatly improved because the customer will not stand for the concomitant increased heat and cost and weight (which has heretofore had to be raised up to the ceiling), nor will customer nor contractor use the heretofore requisite conductor sizes so that again the high intensity lamps have heretofore been limited by being operated at low terminal voltage, hence with low current and low output.

With the illustrated embodiment of FIGS. 1 and 2, however, the control room 120 has the transformer 113 which supplies a 600 volt line 1 (or more than one such line may be used if desired) to provide the arc current source at one end of one of each of different pairs of power groove lamps 117 which are series connected by pairs at their opposite ends by jumpers 123, while the individual reactors 116, electrically located in series with the transformer 113 ground return line G, and thermally remoted from the environment controlled space (121) while physically located in the control room 120, supply the remaining ends of the series pairs arrangement of fluorescent lamps through the individual connections 2, 3, 22, 23, etc.

As is well known, incandescent lamps 124 may also be used at intervals to add red and infrared to the ultraviolet end of the spectrum provided by the fluorescent lights.

By getting away from "in-the-lamp-fixture" reactors, the reactors can be of inexpensive, open-core (with no impregnating compound) construction, and thus easy to cool, and easy to tailor for use with many different voltages, the 600 volts being selected as an example only because it is a standard voltage readily derived, for example, from a 120/240–480 volt transformer, autotransformer connected. The 240 volt circuit is carried on, as seen in FIG. 2, to cathode heater transformer primaries 125, 126, for powering their respective secondary windings 128. Those in the art will appreciate that while the ballast current may be 1.5 amps. at something on the order of 120 volts (representing 180 watts per lamp), cathode heater current is generally only about 0.25 amp at 3.5 volts (per end, or 1¾ watts per lamp) so that ample reason exists for leaving the heater transformers at the lamp locations while removing the ballasts (and any transformer used for the ballast circuits) to a remote location.

In conventional way, power factor can be improved by having some circuits lagging and some leading as by the introduction of capacitors 130 and associate bleeding resistors wherever desired. The lighting units may be located substantially below the ceiling, and, preferably, forced ventilation may be blown over them in order to keep light output better than 90% of the warm-up peak.

Figure 3:
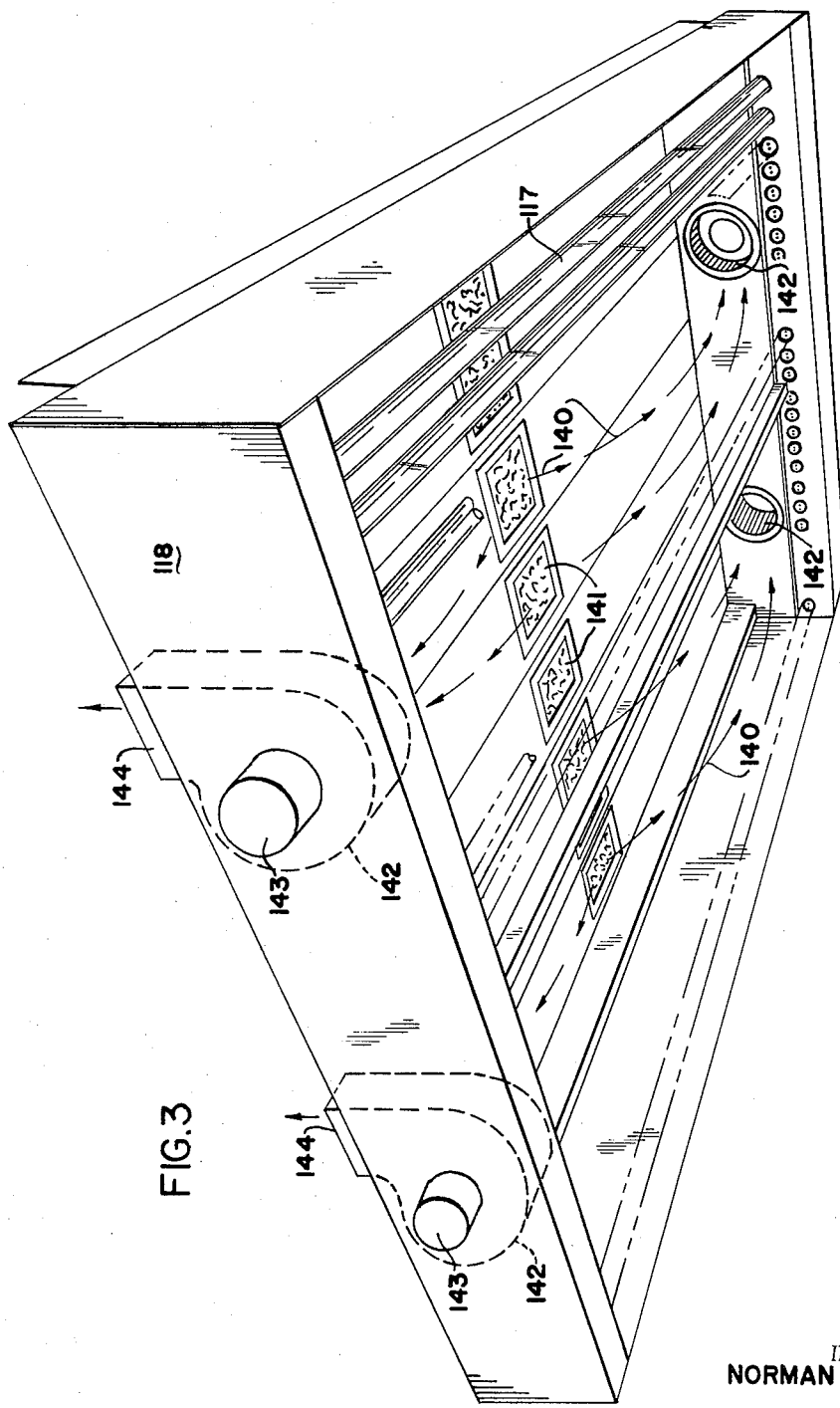
FIG. 3 is a perspective view looking upward and for showing a ventilating arrangement.
Figure 4:
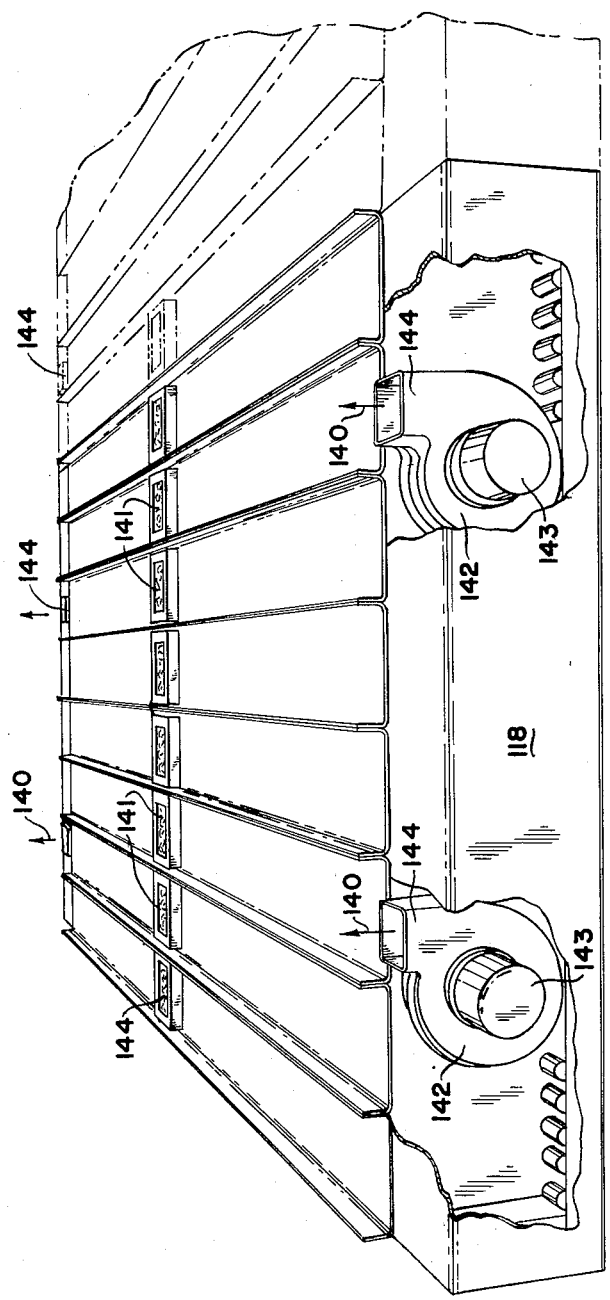
FIG. 4 is a perspective view looking downward for further illustrating a ventilating arrangement as in FIG. 3.

A preferred arrangement for providing negative pressure forced ventilation for the lighting units is shown in FIGS. 3 and 4. As is known, lamps can be kept clean, hence their initial luminosity maintained for a longer time, by filtering the ambient air, but filters interfere with free air flow. As indicated by air flow arrows 140 I introduce cooling air (as from a stack not shown) through a great many relatively large filters 141. This is done by sealing all joints and creating a negative pressure (to cause air flow over and adjacent the lamps) by means of centrifugal blowers 142 driven by motors 143 and discharging through relatively few relatively small area exhaust ducts 144 which may be connected to a single (or plural) exhaust chimney means (not shown). Actually, as shown by FIG. 4, the ratio of total effective cross sectional area of filter inlets to exhaust outlet cross sections is better than one to one, providing effective filtering and all the advantages of negative pressure air flow.

Actually, though, an advantage of the physical and circuitry arrangements of FIGS. 1 and 2, as previously described, is that any cooling requirement is going to be much less (for maximal light output) because the ballasts are located remotely. Furthermore, in the past, a 60-cycle 2′ x 8′ power groove (10 lamp) unit would require 100 lbs. of ballasts and the problem of hanging such units has been considerable. One solution has been the use of high frequency, for example 400 cycles, but providing such high frequency is quite costly, and the present invention achieves substantially the same result (with reactance sizes and weights and wire sizes and weights all reduced) in a different way by providing 60 cycles throughout.

While those in the art will probably understand the above description and the drawings, it may be added that a ballast current, e.g., of 1.5 amps. at 600 volts, derived from the remoted winding 113 flows from conductor 1, through a first lamp 117–1, through a second lamp 117–2, through a remote reactor 116–1, to grounded (or, if desired, ungrounded) neutral, and as many parallel lines (like 1) as desired of course be used. At proper time, there will be a small current (e.g., less than a microamp.) flowing through a starting capacitor such as 131 (from line 1) through a lamp such as 117–2 then by way of the same reactor (116–1) to ground, and meanwhile cathode heating current (e.g., 1.2 amps. at 3.6 volts for each end of each lamp) is supplied by all the transformer secondaries 128 (associated with primary windings 125 or 126) of which 128A may supply two lamps (from different pairs as shown), or four or more for that matter, 128B may supply two lamps of the same pair, 128C1 may serve one lamp (being isolated so as to provide one sort of ballast voltage ground return), 128D may serve the opposite ends of the next pair, 128C2 may serve a lamp having a ground return through power factor correcting capacitor 130 and/or a separate ballast reactor 116–2, and so on, all in some respects conventional but in other respects providing novel advantages in permitting of pre-wired packages which still assure 100% of current (1.5 amps. or higher) for optimum light output, reduction of weight, flexibility of packing maximum lumen output within a given dimension, and permitting selective switching circuiting of lamps or combinations of lamps, particularly for dimming or flashing.

There is thus provided apparatus and method of the class described capable of meeting the objects above set forth, giving increased validity to the results of tests on animals, insects, insecticides, fertilizers, weed killers, plant disease inhibitors and plant and algae growth, and permitting substantial pre-packaging and achieving maximum convenience, safety and economy. One unobvious thing about the arrangement is that it is actually cheaper from an operation and maintenance and even from an installation standpoint to thus depart from standard parts and practices whenever it is desired to have such very high levels of light (e.g., 5,000 foot candles or more than 100 times as much as prevails in the average office).

In breeding a new variety of plant, it must be carried through several generations. Because a plant growth room provides freedom from day-night and seasonal cycles, scientists are able to grow as many as six generations of some kinds of plants yearly, thus speeding up the development of special strains. This is in contrast to one generation in nature.

While I have illustrated and described a particular embodiment, various modifications may obviously be made without departing from the true spirit and scope of the invention which is intended to be defined by the appended claims taken with all reasonable equivalents.

Preferably the blower motors either extend outside the frame modules 118 (as in FIG. 3), or if predominately within the frame module (as in FIG. 4), they have associate openings in the module outer wall, one opening at each motor location (sealing then being done at inner wall joints) so that the maintenance man can observe an appropriate portion of each motor (to see if it is operating) without disassembly of the module.

I claim:

1. A lighting system adapted for environment control in a plant growth chamber, said system comprising a first enclosure means defining a first chamber therewithin, a second enclosure means defining a second chamber therewithin, said second enclosure means being separate from and thermally insulated from said first enclosure means by an insulating structural wall, voltage setp-up transformer and ballast reactors all located within said first chamber and being both physically and thermally remote from said second chamber, a source of alternating current supply operatively connected with said step-up transformer, said second chamber comprising a plant growth space, fluorescent lamps disposed within said plant growth space and being operatively connected with said step-up transformer and said ballast reactors to provide ballast current, said fluorescent lamps having cathodes, step-down voltage transformers disposed within said second chamber and adjacent said lamps and connected with said cathodes to provide a local voltage supply for heating said cathodes, said step-down voltage transformers being connected with said alternating current source, whereby cost of installation and of maintenance of equipment is minimized, and ambient of the interior of said plant growth space is protected against the effect of apparatus heating to a greater extent than heretofore, and relatively low cost wiring may be used between chambers and throughout the installation.

2. A system as defined in claim 1 including first duct means and associated negative pressure creating plural blowers arranged to draw air over said lamps and to exhaust the same through said first duct means and from said plant growth space, and second duct means including air filters for supplying cooling air to the plant growth space as required by the negative pressure created by said blowers, the second duct means having an effective cross sectional area greater than that of said first duct means.

3. Apparatus as defined in claim 1 wherein said lamps are mounted within a lighting fixture comprising a metallic frame module, said lighting fixture having cooling duct means and associated motor driven centrifugal blowers, the motors for said blowers having portions observable from outside the lighting fixture.

References Cited by the Examiner

UNITED STATES PATENTS

| | | | |
|---|---|---|---|
| 2,507,101 | 5/1950 | Hall | 315—97 X |
| 2,719,937 | 10/1955 | Keiffer | 315—97 X |
| 2,866,133 | 12/1958 | Strange et al. | 315—97 X |

GEORGE N. WESTBY, *Primary Examiner.*

ROBERT SEGAL, *Examiner.*

D. E. SRAGOW, *Assistant Examiner.*